United States Patent [19]

Weeber et al.

[11] Patent Number: 5,210,762
[45] Date of Patent: May 11, 1993

[54] SONET POINTER INTERPRETATION SYSTEM AND METHOD

[75] Inventors: William B. Weeber, Apex; Dale L. Krisher, Raleigh, both of N.C.

[73] Assignee: Alcatel Network Systems, Inc., Richardson, Tex.

[21] Appl. No.: 771,038

[22] Filed: Oct. 2, 1991

[51] Int. Cl.[5] ............................................. H04L 1/08
[52] U.S. Cl. .................................. 371/69.1; 371/57.1
[58] Field of Search ................... 371/69.1, 57.1, 67.1; 370/55, 58.1

[56] References Cited

U.S. PATENT DOCUMENTS 4,964,095 10/1990 Tyrrell et al. .......................... 370/55
4,967,405 10/1990 Upp et al. ............................. 370/1

Primary Examiner—Vincent P. Canney
Attorney, Agent, or Firm—Ware, Fressola, Van Der Sluys & Adolphson

[57] ABSTRACT

A SONET pointer interpretation in system which an Alarm Indication Signal (AIS) of a first type is interpreted as a subset of Loss of Pointer (LOP) of a first type. Specific events are defined for entering an AIS type 1 state and for exiting this state. Specific events are also defined for entering an LOP type 1 state and for exiting this state. Finally, a truth table is defined for mapping these states into a valid pointer (NORM) state, an AIS of a second type state and an LOP of a second type state.

8 Claims, 12 Drawing Sheets

CCITT Pointer Interpretation State Diagram

Bellcore Pointer Interpretation State Diagram

ANV Pointer Interpretation State Diagram

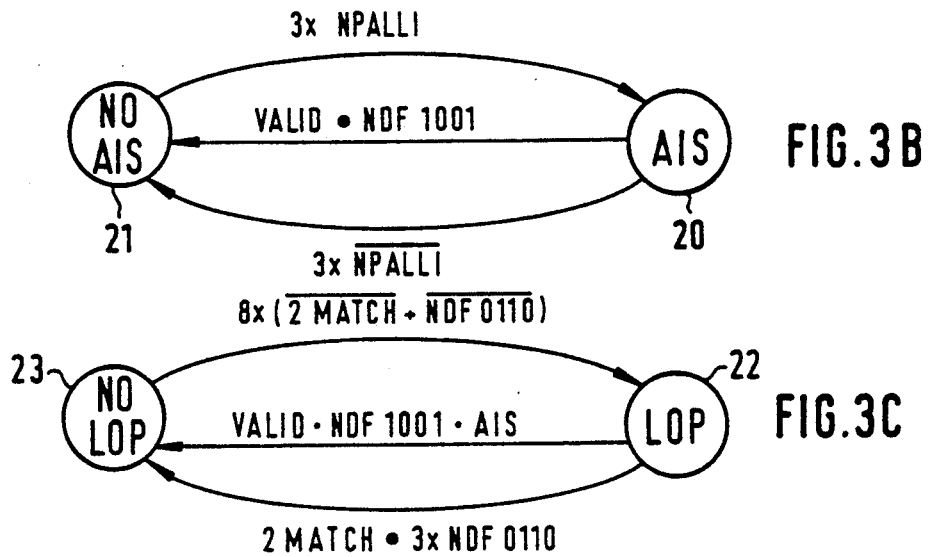
FIG. 3B
FIG. 3C
| TYPE 1 | HARDWARE STATE | | SOFTWARE STATE | TYPE 2 |
|---|---|---|---|---|
| | AIS | LOP | | |
| | 0 | 0 | NORM | |
| | 0 | 1 | LOP | |
| | 1 | 0 | AIS (Temporary State) | |
| | 1 | 1 | AIS | |
FIG. 3D
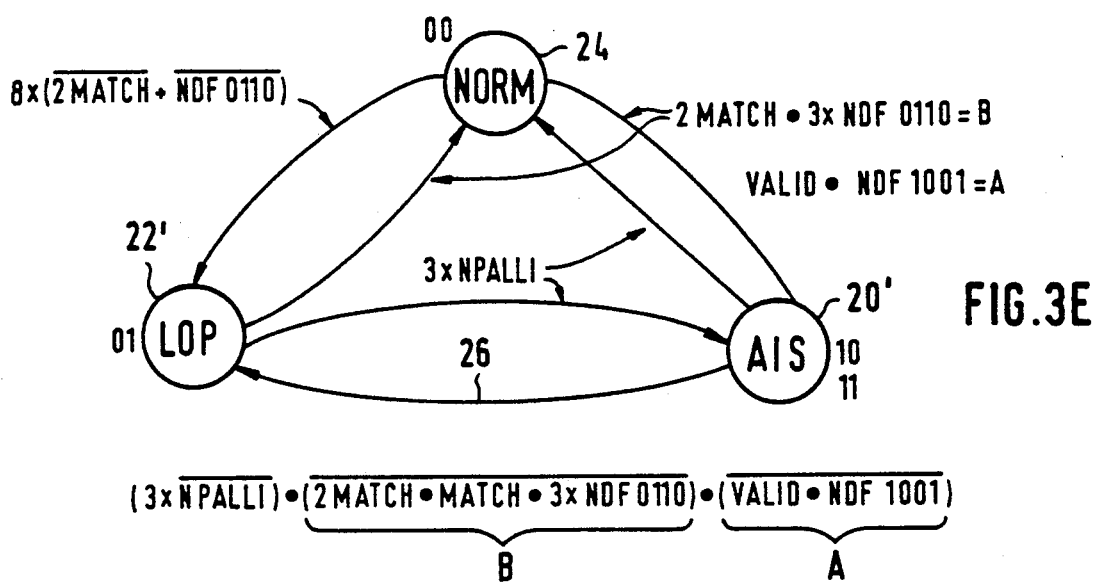
FIG. 3E

FIG. 4: TX VT PROCESSING

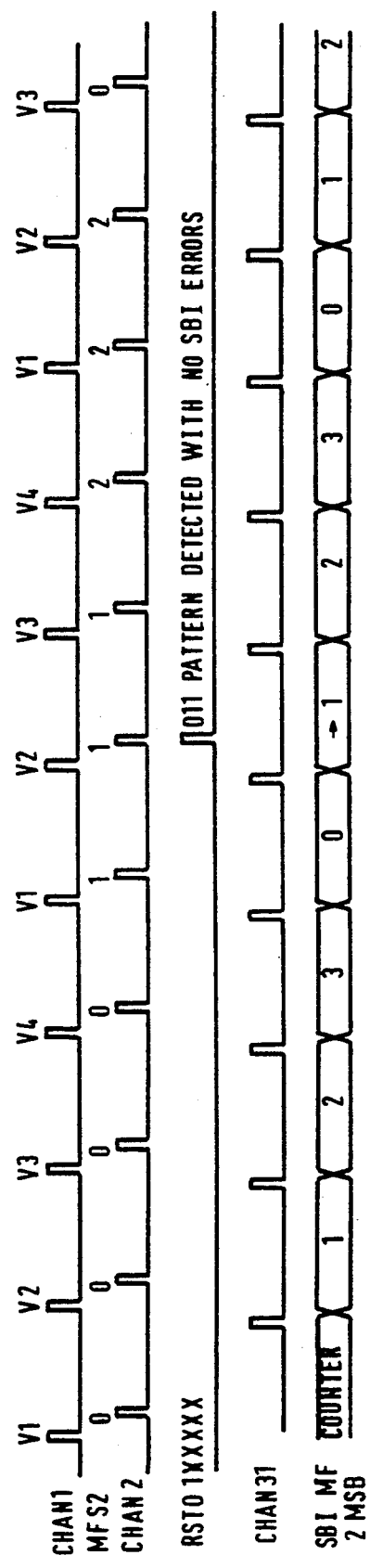
FIG.5 : TX SBI MULTIFRAME SYNCHRONIZATION

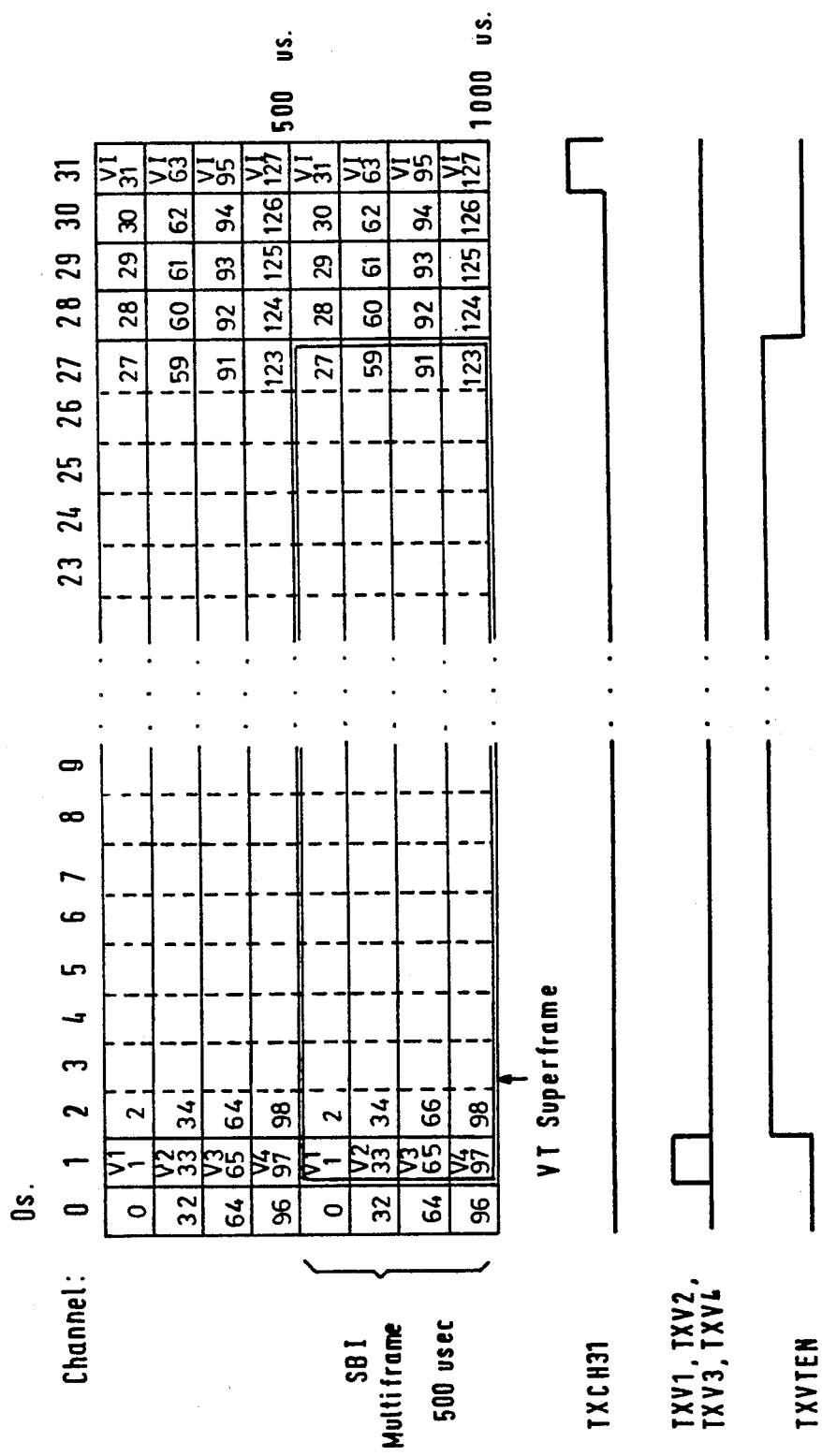
FIG. 6: TX SBI MULTIFRAME COUNTER TIMING

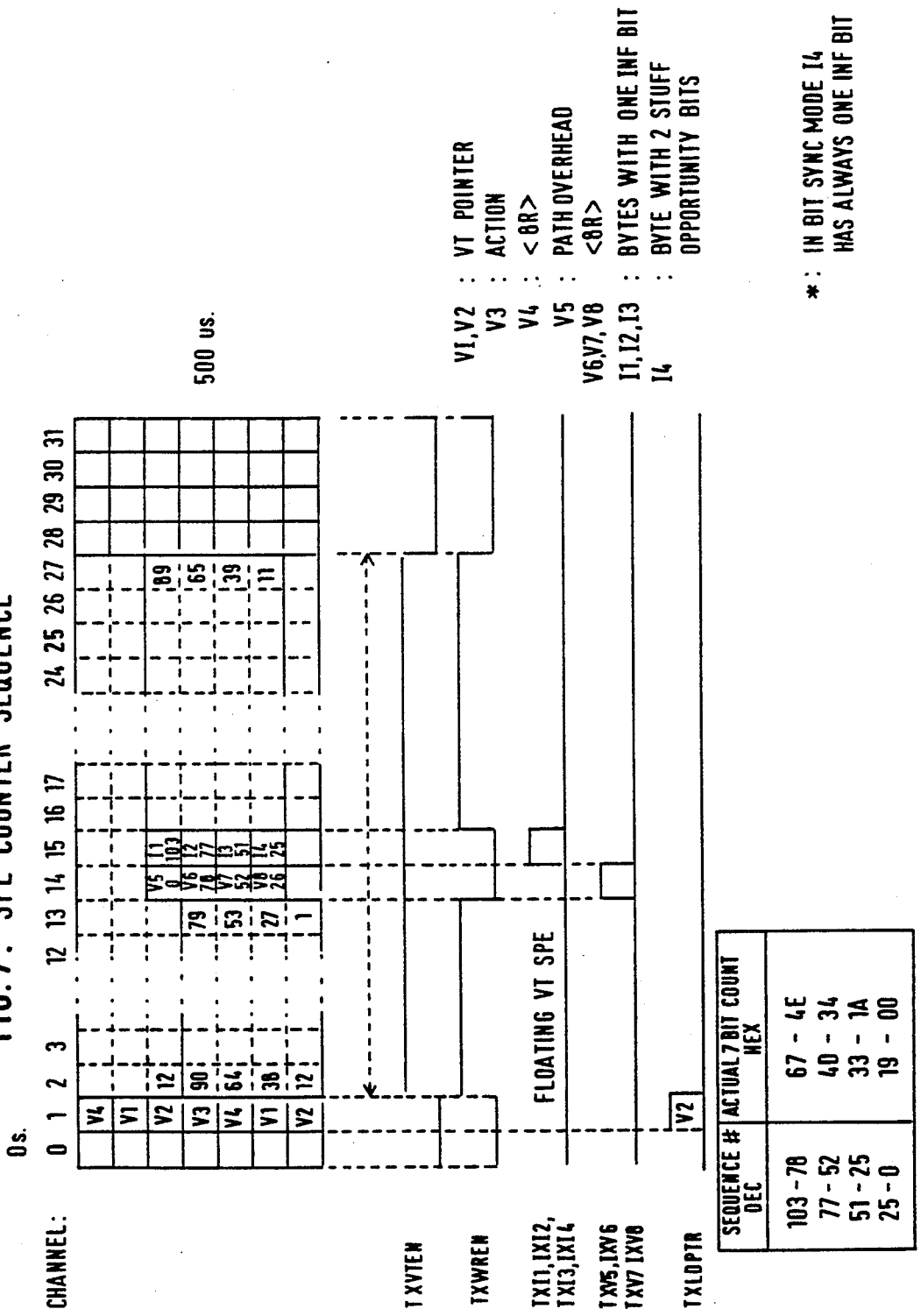

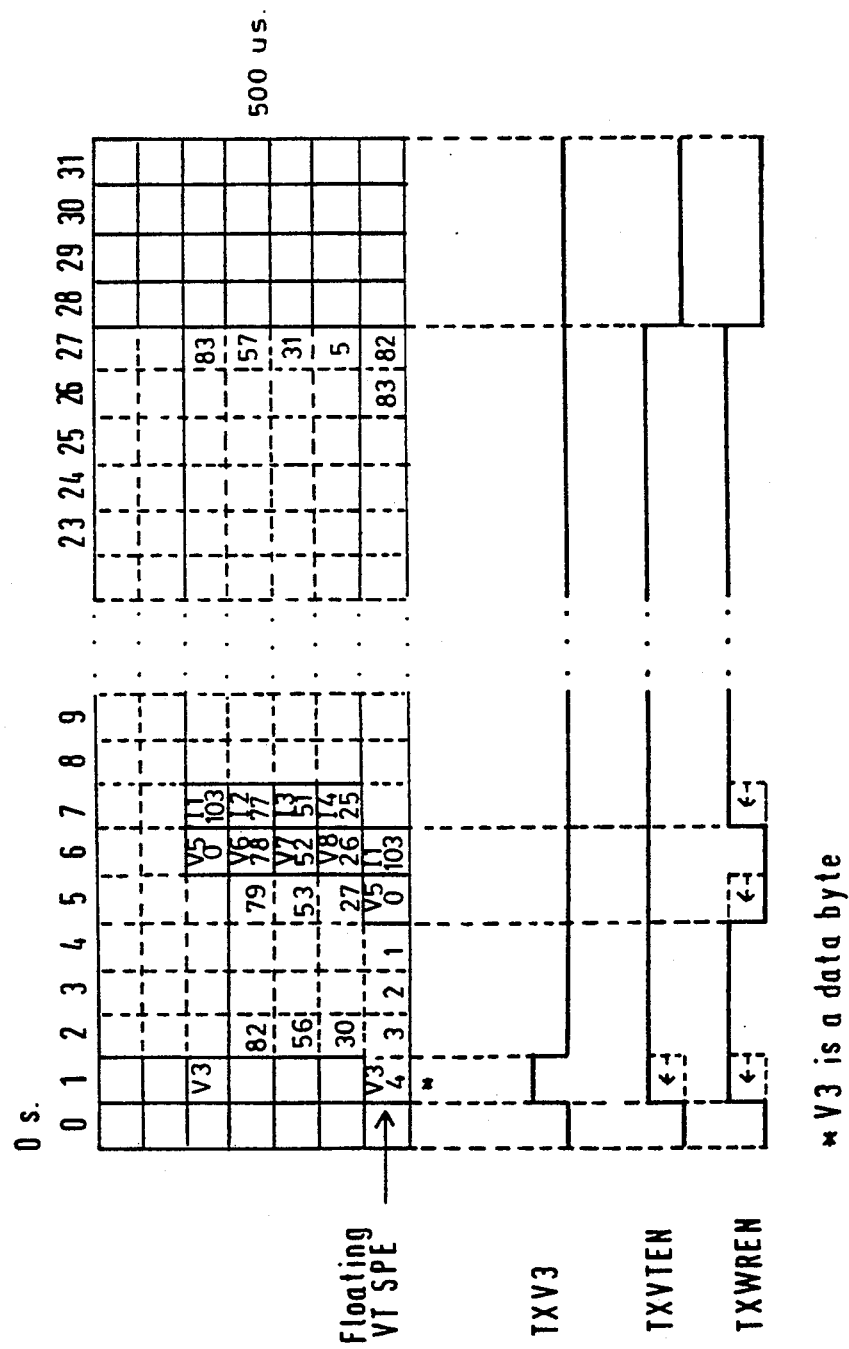
FIG. 8: TX POINTER DECREMENT TIMING

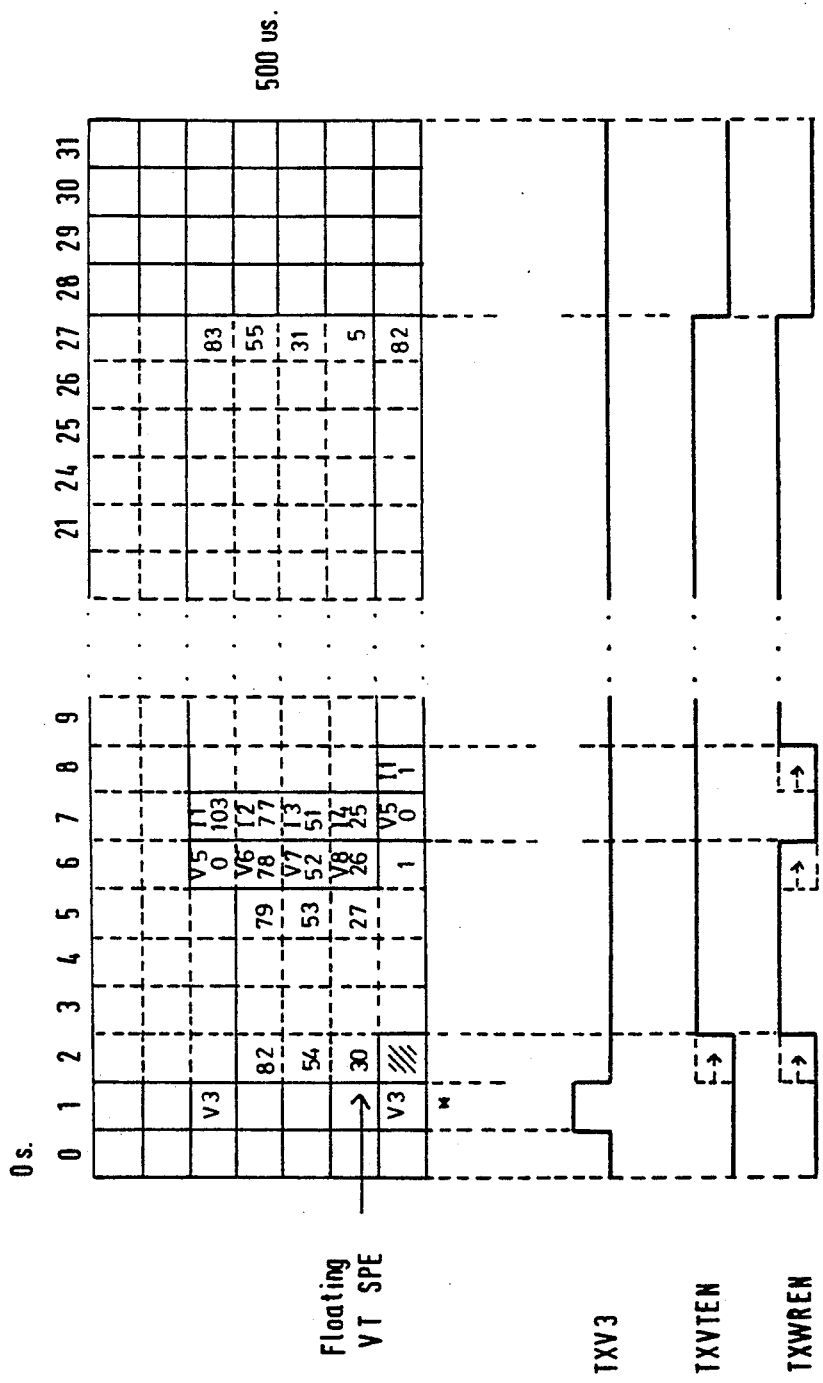
FIG.9: TX POINTER INCREMENT TIMING

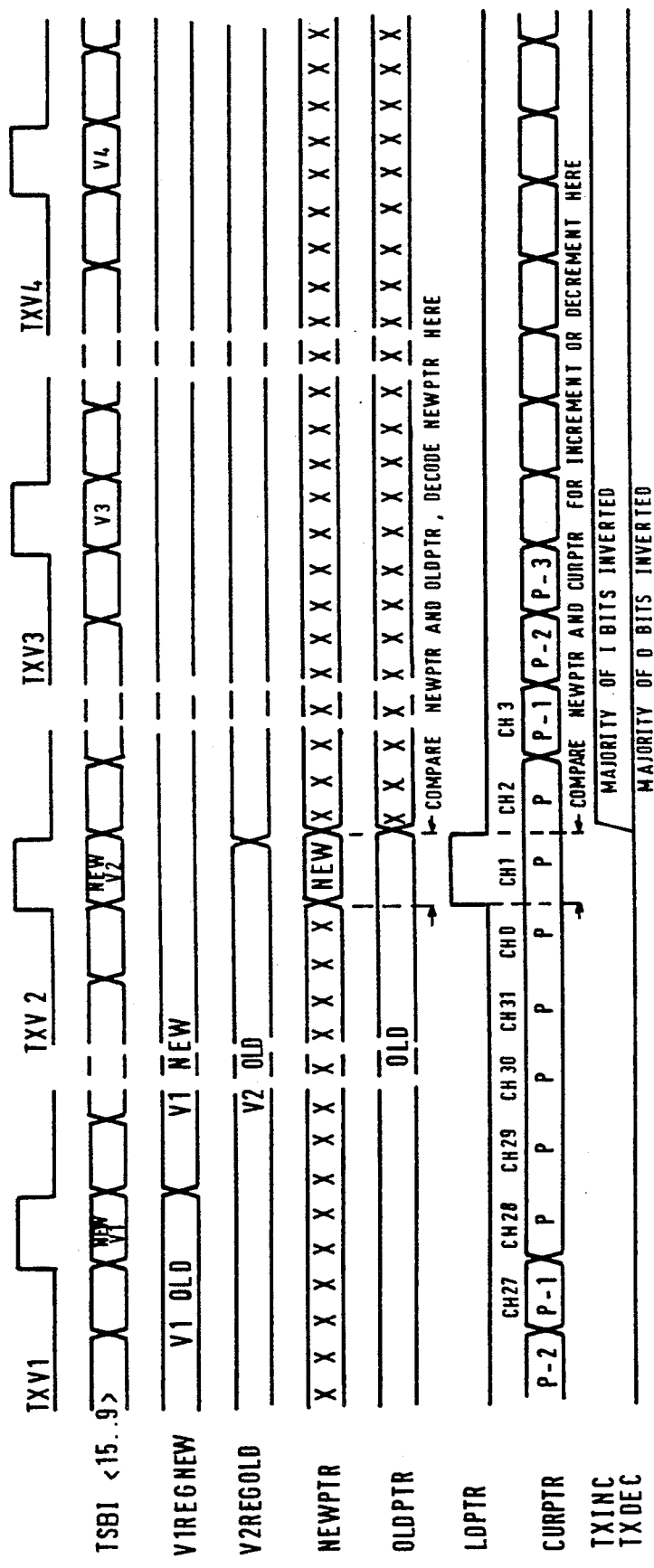
FIG.10: TX POINTER TRACKING TIMING

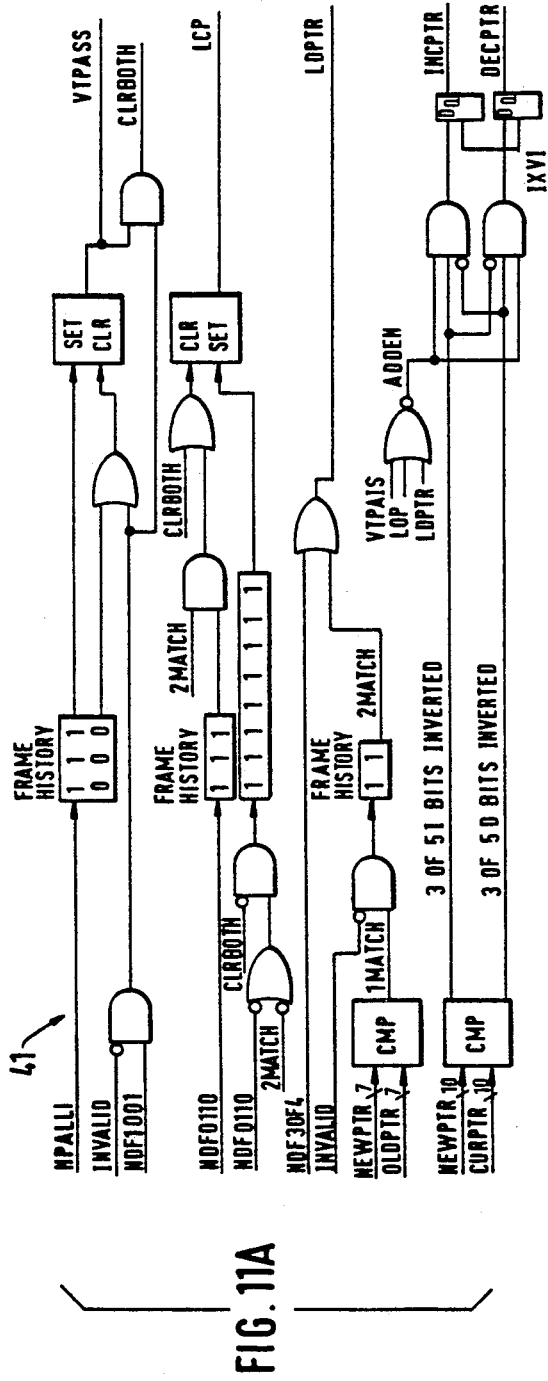
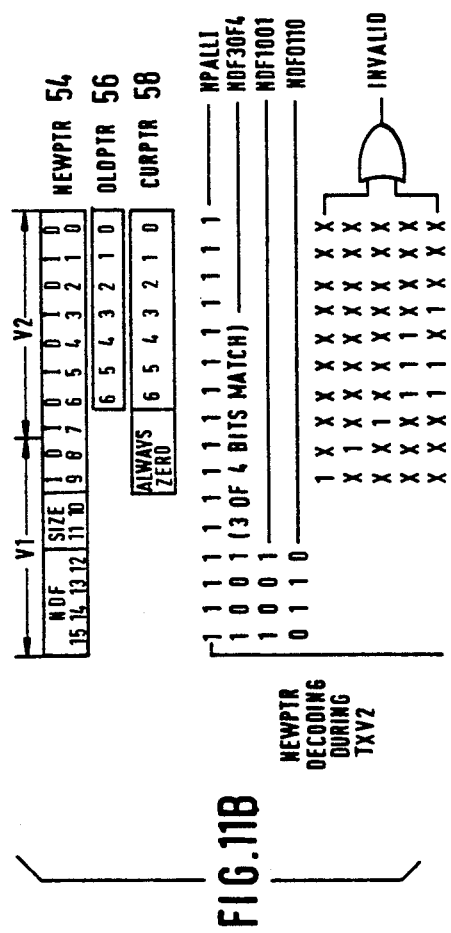
FIG. 11A
FIG. 11B

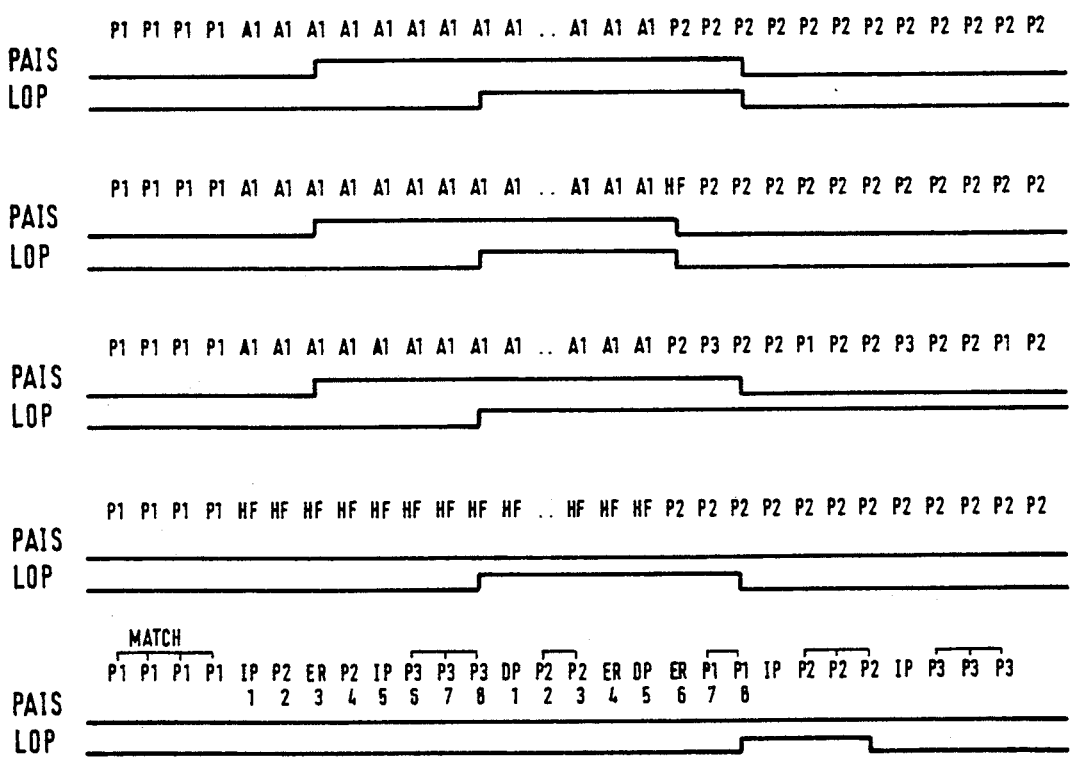
FIG.12: VT PATH AIS AND LOP SCENARIOS
P1, P2, P3 - UNIQUE POINTER VALUES WITH NORMAL NEW DATA FLAG
A1 - ALL ONES IN V1 AND V2
IP - INCREMENT POINTER COMMAND
DP - DECREMENT POINTER COMMAND
ER - ERROR IN POINTER VALUE OR ERROR IN NEW DATA FLAG

SONET POINTER INTERPRETATION SYSTEM AND METHOD

TECHNICAL FIELD

The present invention is related to telecommunications and in particular to pointer interpretation for implementation in the North American Synchronous Optical Network communications (SONET) and the worldwide synchronous digital hierarchy (SDA) as defined by ETSI (European Technical Standards Institute) and CCITT (International Telephone and Telegraph Consultative Committee.

BACKGROUND OF THE INVENTION

The present invention provides a robust, consistent and safe hardware implementation of the SONET pointer interpretation function. This pointer interpretation function is specified to some extent in Bellcore Document TR-TSY-000253 and in CCITT recommendation G.783.

However, the standard suggested by the CCITT/ETSI AU-4 pointer is slightly different than that specified by ANSI/Bellcore STS-3C pointer. The STS-3C pointer comprises three concatenated STS-1 pointers, #1, #2 and #3 as shown and described below.

The AU-4 pointer also comprises three pointers of which one pointer (#1) carries the pointer value and #2 and #3 are not used and carry fixed values as also shown below.

| CCITT/ETSI AU-4 | | |
|---|---|---|
| H1 and H2 #1 Normal NDF+ss+ Offset | H1 and H2 #2 NDF Enabled+ rr+All 1's | H1 and H2 #3 NDF Enabled+ rr+All 1's |
| BELLCORE STS-3C | | |
| H1 and H2 #1 Normal NDF+rr+ Offset | NDF Enabled+ rr+All 1's | NDF Enabled+ rr+All 1's |

Although the range of offset values for AU-4 and STS-3C are the same; namely, from zero to 782, there is a difference of the ss versus rr bits since CCITT/ETSI has defined the ss bits to represent the transported synchronous payload envelope (AU-x, TU-x). Bellcore and ANSI have yet to define the rr bits and currently they are considered "reserved". This lack of definition requires the rr bits to be set to 0's by transmitters and ignored by receivers to meet the North American Standard. Such a definition incompatibility of bits 5 and 6 can cause problems because CCITT/ETSI uses these bits to determine the pointer state when implementing the pointer interpretation algorithm. If a CCITT/ETSI pointer interpretation circuit is to receive 0's in the ss bit when expecting something else, it should declare the pointer word invalid and initiate the loss of pointer status.

There are also differences in the definition of the pointer states between CCITT/ETSI and Bellcore. CCITT/ETSI documentation includes state diagrams for pointer interpretation. Bellcore documents do not include state diagrams, but only word descriptions. FIG. 1 is an illustration of the CCITT/ETSI state diagram while FIG. 2 is a state diagram interpretation of the Bellcore requirements. The state diagram used in association with the present invention is presented in FIGS. 3A and 3E. In particular, the present invention uses an algorithm implemented in hardware so as to create an Alarm Indication Signal (AIS) and NO AIS state machine and a loss of pointer (LOP) and NO LOP state machine. These hardware implemented state machines are then mapped through an algorithm to produce a single equivalent state diagram as shown in FIGS. 3A and 3E.

CCITT has attempted an interpretation of the CCITT pointer interpretation requirements in their document identified as G.783.

The Bellcore TR-TSY-000253 document states that the removal of AIS is to be detected as one of the following conditions: A valid pointer observed for three consecutive frames with NDF=0110 or a valid pointer value with NDF=1001. A transition from AIS to LOP is not defined. It is believed that such a requirement is necessary and likely to be added in the future. Based on the Bellcore document, if a non AIS condition (not all ones), but also non-valid pointer condition persists after an AIS has been declared, the AIS alarm is not removed; thereby providing inaccurate information about the status of the pointer. It is believed however, that LOP is a more appropriate status in such a situation.

CCITT recognizes this condition and has added a path from AIS to LOP, however it does not have full coverage of the case described above.

Another shortcoming with the prior art relates to random pointers which can result in unreliable LOP detection (latched LOP). The Bellcore TR-TSY-000253 document definition of a valid pointer is not complete. The Bellcore requirement to enter LOP is no valid pointer in eight consecutive frames. If incoming pointers are random with at least one in eight meeting the valid pointer definition, then an LOP alarm is never declared. Clearly this should be an LOP condition since a valid pointer value cannot be established.

Although CCITT has a more implicit definition of valid pointer, LOP detection of random pointers has the same deficiencies.

It is not possible to derive a hardware implementation to meet all the current requirements and not be subject to hardware change if future requirements change. In addition, each pointer processor design could possess different characteristics due to the wide range of interpretation possible from the requirement documents.

The present invention provides a system which overcomes the aforementioned difficulties. In particular, the present invention overcomes the above mentioned difficulties by treating an AIS condition as a subset of the LOP condition, exiting the AIS state when all ones does not exist for three frames, and defining an LOP as any sequence of pointers that do not meet the requirement to establish a valid pointer value within eight frames.

By making AIS a subset of LOP, LOP is active when AIS (all ones) is persistent. The present invention removes the AIS when all ones is not present for three consecutive frames. If during these three frames the criteria for establishing a valid pointer value does not exist (three consecutive matching in-range pointers with NDF=0110 or one in-range pointer with NDF=1001), then the LOP condition persists. With this information provided to associated software, the associated software can easily be modified to latch or not latch the AIS alarm from the system perspective. If the requirements change with respect to latching AIS, extensive hardware changes can be avoided.

The published requirements for exiting LOP are clear (three consecutive matching in-range pointers with NDF=0110) while the requirements for entering an LOP state are incomplete and inconsistent as explained above. The present invention operates on the criteria that if the requirement to exit LOP does not exist, then the system should be in an LOP state. Thus the present invention has defined a valid pointer as three matching in-range pointers with NDF=0110. If a valid pointer is not seen for eight consecutive frames, an LOP is declared. Such a declaration prevents random pointers with repeating values from not causing entry of the LOP state.

Normally, three consecutive matching pointers are guaranteed at least once every four frames even in the presence of pointer adjustments. This result guarantees at least two matching pointer opportunities in every eight frames under the maximum rate of pointer movement. Therefore the present invention is error tolerant to one in eight errorred pointers due to bit errors.

SUMMARY OF THE INVENTION

The present invention is a method and system for performing SONET pointer interpretation. The methodology of the present invention treats the Alarm Indication Signal (AIS) as a subset of the Loss of Pointer (LOP) state, thereby exiting AIS when all ones does not exist for three frames, and defining an LOP as any sequence of pointers that do not meet the requirement to establish a valid pointer value within 8-frames. The present invention remaps a first state machine defining a first type of AIS state and NO AIS state and a second state machine defining a first type of LOP state and NO LOP state into a third state machine defining a new (second) type of AIS state, a new (second) type of LOP state and a valid (in-range) pointer (NORM) state.

OBJECTS OF THE INVENTION

It is the principal object of the present invention to provide a robust, consistent and safe hardware implementation of SONET pointer interpretation by treating an Alarm Indication Signal (AIS) as a subset of Loss of Pointer (LOP). It is a further object of the present invention to provide a method and system for SONET pointer interpretation in which the AIS state is exited when all ones do not exist for three SONET frames.

A still further object of the present invention is to provide a method and system for SONET pointer interpretation in which the LOP state is defined as any sequence of pointers that do not meet the requirement to establish a valid pointer value within eight frames.

Another object of the present invention is to provide a method and system for SONET pointer interpretation that can be applied to all synchronous transport modules as defined by Bellcore, ANSI, ETSI and CCITT, including but not limited to level 1 (STM-1), synchronous transport signal, level 1 (STS-1) and virtual tributary (VT and TU) pointer interpretation functions.

Other objects of the present invention will in part be obvious and will in part appear hereinafter.

BRIEF DESCRIPTION OF THE DRAWINGS

For a fuller understanding of the nature and objects of the present invention reference should be made to the following detailed description taken in connection with the accompanying drawings in which:

FIG. 3B is a state diagram of a first type of AIS state to NO AIS state according to the present invention.

FIG. 3C is a state diagram of a first type of LOP state and NO LOP state according to the present invention.

FIG. 3D is a truth table for mapping the first type of AIS, NO AIS, LOP and NO LOP states into a new (second type) AIS state, a new (second type) LOP state and a NORM state.

FIG. 3E is a state diagram illustrating the AIS, LOP, and NORM states generated via the FIG. 3D truth table, along with the transition events which correspond to the events and states shown in FIGS. 3A and 3B.

FIG. 4 is an overall block diagram of the transmit virtual tributary processing system implementing SONET pointer interpretation according to the present invention in which separate state machines are illustrated for AIS/NO AIS and LOP/NO LOP.

FIG. 5 is a timing diagram showing the transmitter serial bus interface (SBI) multi-frame synchronization waveforms for the system shown in FIG. 4.

FIG. 6 illustrates SBI multiframe counter timing information for the system shown in FIG. 4.

FIG. 7 illustrates the synchronous payload envelope (SPE) counter sequence for the system shown in FIG. 4.

FIG. 8 illustrates the timing associated with the transmitter pointer decrement counter.

FIG. 9 illustrates the timing associated with the transmitter pointer increment counter.

FIG. 10 illustrates the timing associated with transmitter pointer tracking.

FIG. 11A is a block diagram of the transmitter pointer interpretation logic circuitry corresponding to the pointer decode and pointer adjust control modules shown in FIG. 4.

FIG. 11B illustrates the relationships of NEWPTR, OLDPTR and CURPTR, with respect to NPALL1, NDF3OF4, NDF1001, NDF0110 and how the INVALID state is enabled.

FIG. 12 illustrates timing diagrams for various AIS and LOP scenarios.

BEST MODE FOR CARRYING OUT THE INVENTION

The present invention relates to a system and method for robust, consistent implementation of the Synchronous Optical Network (SONET) pointer interpretation function. The overall SONET specification is detailed in ANSI document TI.105-1988 which is hereby incorporated by reference. For pointer interpretation requirements, Bellcore has detailed its implementation in Bellcore document TR-TSY-000253 which is also hereby incorporated by reference. CCITT has also presented its recommendation description for pointer interpretation in CCITT document G.783 which is also incorporated by reference herein.

Figure 1:
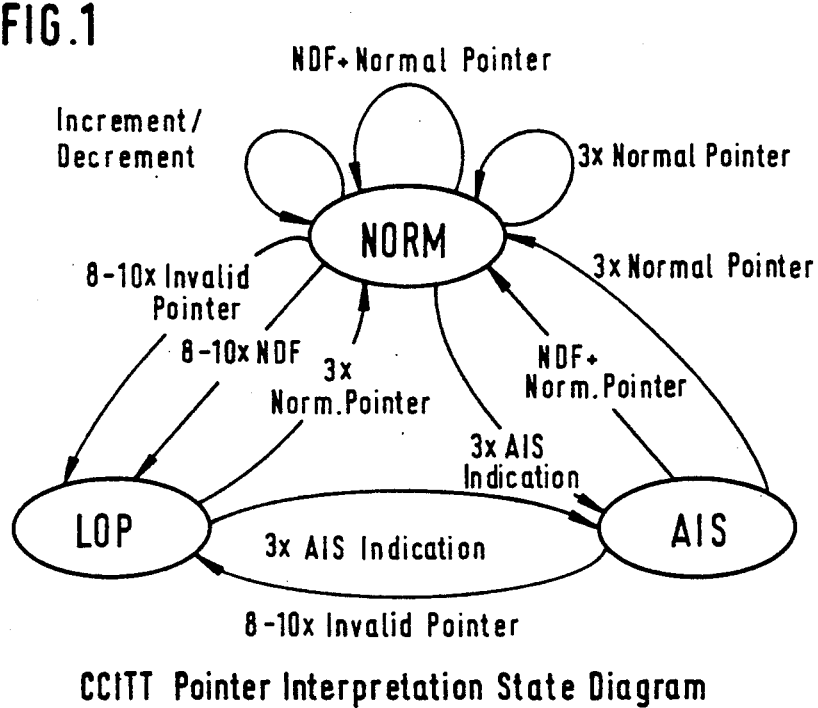
FIG. 1 is a state diagram of the CCITT SONET pointer interpretation.

The CCITT pointer interpretation state diagram is illustrated in FIG. 1. An interpretation of a state diagram for the Bellcore document is presented in FIG. 2.

Figure 3A:
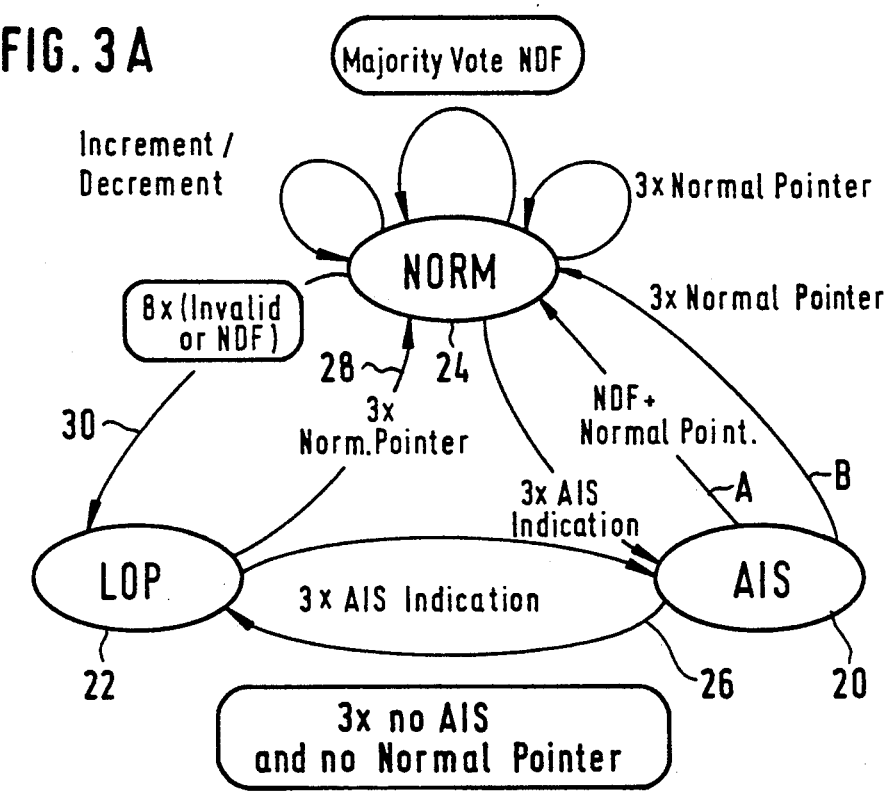
FIG. 3A is a SONET pointer interpretation state diagram according to the present invention.

The present invention approaches pointer interpretation from a different state diagram perspective which, is set forth in FIG. 3A. It is believed that this state diagram implementation achieves several advantages over perceived shortcomings with both the CCITT pointer interpretation and the Bellcore interpretation.

More particularly, Bellcore TR-TSY-000253 states that the removal of the Alarm Indication Signal (AIS) is to be detected as a valid pointer observed for three consecutive frames. Such a statement interpretation indicates that a transition from AIS to loss of pointer (LOP) is not allowed. However, such a transition is considered necessary and is likely to be added in the future.

Presently, if a non AIS condition (not all ones) with invalid pointer values persists after a AIS has been declared, the AIS alarm is latched, providing inaccurate information about the status of the pointer value. The present invention takes the approach that LOP is the correct status in such a situation.

The CCITT document recognizes this occurrence and has added a path from AIS to LOP, however it does not have full coverage of the case described above.

Furthermore, random pointers can produce unreliable LOP detection (latched $\overline{LOP}$). In the Bellcore TR-TSY-000253 document, an incomplete definition is presented for valid pointer. The requirement to enter LOP is no valid pointer in eight consecutive frames. If incoming pointers are random with at least one in eight meeting the valid pointer definition, then an LOP alarm is never declared. Clearly, this event should be an LOP condition. The result, in effect, is a latched LOP in the inactive state.

Although the CCITT document has a more complete definition of valid pointer, LOP detection of random pointers have the same problem.

It is also difficult to derive a hardware implementation to meet the current requirements and still not be subject to change in the future if those requirements change. In addition, each pointer processor design could possess different characteristics due to the wide rang of interpretation possible from the above-mentioned requirements.

The present invention as illustrated in the state diagram of FIGS. 3A and 3E overcomes the above-mentioned difficulties by treating a first type of AIS state as a subset of a first type of LOP state, and exiting AIS when all ones does not exist for three consecutive frames. The present invention also defines the first type of LOP state as any sequence of pointers that do not meet the requirement to establish a valid pointer value within 8-frames.

By making AIS a subset of LOP, LOP is active when an AIS (all ones) is persistent. The present invention removes the AIS when all ones is not present for three consecutive frames. If during these three frames the criteria establishing a valid pointer value does not exist (three consecutive matching inrange pointers with NDF=0110 or one in-range pointer with NDF=1001), the LOP persists. With such information provided to software, the software can easily be modified to maintain or discontinue the AIS alarm from a system perspective. If the requirements change with respect to latching AIS, expensive hardware changes are thereby avoided.

Furthermore, the prior art requirements for entering an LOP are incomplete and inconsistent. The present invention takes the perspective that if the requirement to exit LOP does not exist, then the system should be in an LOP or AIS state. The present invention defines a valid pointer as three consecutive matching in-range pointers with NDF=0110. If a valid pointer is not seen for eight consecutive frames, an LOP is declared. Such a declaration prevents random pointers from resulting in unreliable LOP detection.

Normally, at least three consecutive matching pointers are guaranteed every four frames, even in the presence of pointer adjustments. This result guarantees at least two matching pointer opportunities every eight frames under the maximum rate of pointer movement. Therefore the present invention is error tolerant to one in eight errorred pointers due to bit errors.

More specifically, Table 1 illustrates the subtle differences between the AU-4 pointer defined by CCITT-/ETSI in their G.783 recommendation and the Bellcore STS-3C pointer defined in their TR-TSY-000253 specification. It should be noted that the AU-4 pointer comprises three pointers of which one pointer (#1) carries the pointer value while #2 and #3 pointers are not used and carry fixed values as shown in Table 1. In addition, the STS-3C pointer comprises three concatenated STS-1 pointers, #1, #2, and #3 as shown in Table 1.

TABLE 1

| CCITT/ETSI AU-4 | | |
|---|---|---|
| H1 and H2 #1 Normal NDF+ss+ Offset | H1 and H2 #2 NDF Enabled+ rr+All 1's | H1 and H2 #3 NDF Enabled+ rr+All 1's |
| BELLCORE STS-3C | | |
| H1 and H2 #1 Normal NDF+rr+ Offset | NDF Enabled+ rr+All 1's | NDF Enabled+ rr+All 1's |

Figure 2:
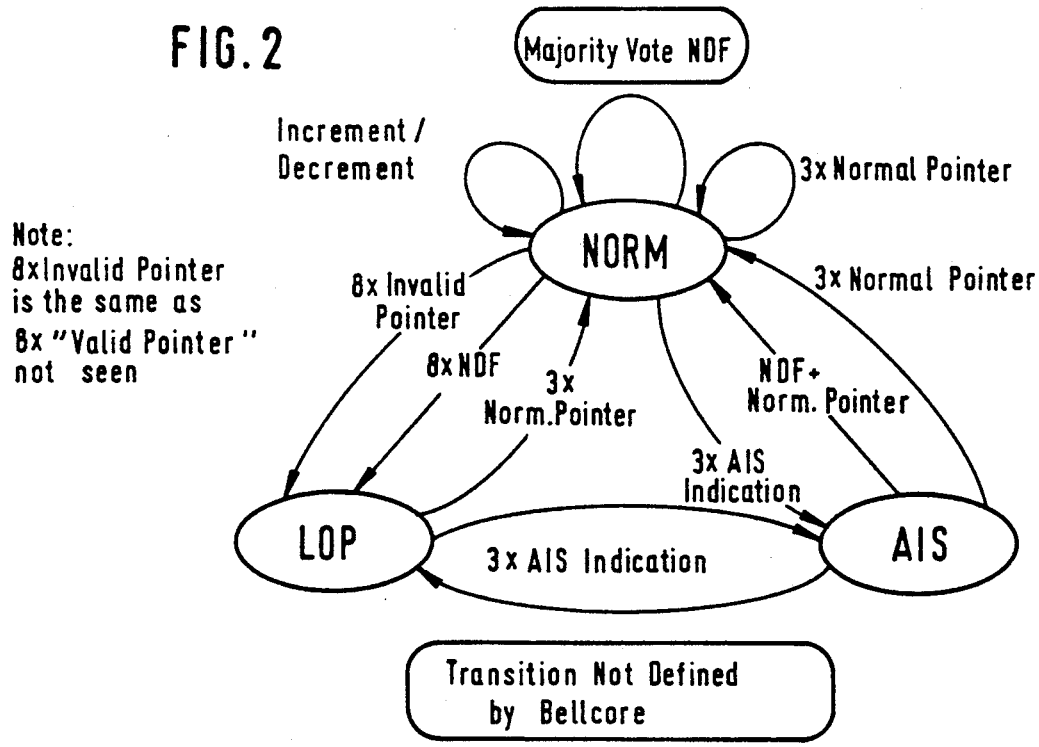
FIG. 2 is an interpretation of Bellcore document TR-TSY-000253 with respect to SONET pointer interpretation.

FIG. 1 illustrates the state diagram of the CCITT pointer definition and FIG. 2 illustrates a similar pointer definition based upon the Bellcore TY-TSY-000253 requirements.

Table 2 presents the definition of pointer states for the CCITT definition, the Bellcore definition and that of the present invention.

TABLE 2

| DEFINITIONS OF POINTER STATES |
|---|
| Normal Pointers: |
|   CCITT |
|     Normal NDF + ss + Offset Value in Range (See FIG. 1) |
|   Bellcore |
|     Normal NDF + rr + Offset Value in Range (rr bits not defined) (See FIG. 2) |
|   Present Invention |
|     Normal NDF + xx + Offset Value in Range (xx bits ignored in the disclosed embodiment, but could be included to accommodate AU-4 and VT pointer interpretation) (See FIGS. 3A and 3E) |
| Increment Points: |
|   CCITT |
|     Normal NDF + ss + 3-5 of 5 bits inverted + 3-5 of 5 bits not inverted + Previous NDF Enable, Increment or Decrement more than 3 times ago |
|   Bellcore |
|     3-5 of 5 I bits inverted + No Load Pointer criteria |
|   Present Invention |
|     NDF ignored + rr bits ignored + 3-5 of 5 I bits inverted + 3-5 of 5 D bits not inverted + no Path AIS, Loss of Pointer or Load Pointer states active |
| Decrement Pointer: |
|   CCITT |
|     Normal NDF + ss + 3-5 D bits inverted + 3-5 of 5 I bits not inverted + Previous NDF Enable, Increment or Decrement more than 3 times ago |
|   Bellcore |
|     3-5 of 4 I bits inverted + No Load Pointer criteria |
|   Present Invention |
|     NDF ignored + rr bits ignored + 3-5 of 5 D bits |

TABLE 2-continued
DEFINITIONS OF POINTER STATES inverted + 3-5 of 5 I bits not inverted + no Path AIS,
Loss of Pointer or Load Pointer states active

New Data Flag (NDF Enable)
CCITT
   NDF (all bits match) + ss + Offset Value in Range
Bellcore
   NDF (3 of 4 bits match) + rr + Offset Value in Range
   (rr bits not defined)
Present Invention
   NDF (3 of 4 bits match) + xx + Offset Value in Range
   (xx bits ignored but could be included to accommodate
   AU-4 and VT pointer interpretation)

AIS indication
CCITT
   H1 + H2 = 1111111111111111
Bellcore
   H1 + H2 = 1111111111111111
Present Invention
   H1 + H2 = 1111111111111111

Invalid Pointer
CCITT
   Any other + Normal Pointer with Offset Value not
   Equal to Active Offset (where "Any Other" means other
   than the cases defined above)
Bellcore
   Any pointer which cannot be interpreted by the rules of
   Section 3.5 (there is no specific definition of an "Invalid
   Pointer")
Present Invention
   NDF value other than the normal 0110 or pointer value
   Out of Range or pointer value not identical the last 3
   times in a row (the XX bits could be included to
   accommodate AU-4 and VT pointer applications)

Concatenation Indication
CCITT
   H1 + H2 = NDF Enabled + dd + 1111111111 (dd bits
   undefined and ignored)
Bellcore
   H1 + H2 = NDF Enabled + rr + 1111111111 (rr bits
   undefined and ignored)
Present Invention
   H1 + H2 = NDF Enabled + rr + 1111111111 (rr bits
   undefined and ignored)
   where:
      H1, H2 - Two bytes allocated to a pointer which
      indicate the offset in bytes between the pointer and the
      first byte of the synchronous transport signal synchronous
      payload envelope (STS SPE). The pointer is used to
      align the STS level 1 (STS-1) transport overheads in an
      STS level N (STS-N) signal as well as perform
      frequency justification. The H1, H2 bytes are provided in
      all STS-1 signals within an STS-N signal;
      AIS = Alarm Indication Signal (AIS). A code
      sent downstream in a digital network as an indication that
      an upstream failure has been detected and alarmed. It is
      associated with multiple transport layers as shown in
      FIG. 30 of ANSI T1.105-1988;
      NDF = New Data Flag: Bits 1-4 (N bits) of the
      pointer word carry a New Data flag. It is the mechanism
      which allows an arbitrary change of the value of the
      pointer if that change is due to a change in the payload;
      Four bits are allocated to the flag to allow for
      error correction. The decoding may be performed by
      accepting NDF enabled if at least three bits match.
      Normal (NDF inactive) operation is indicated by a '0110'
      code in the N bits, NDF active is indicated by inversion
      of the N bits to '1001'. The new alignment is indicated by
      the pointer value accompanying the New Data Flag and
      takes effect at the offset indicated; and
         D - indicates decrement when inverted
         I - indicates increment when inverted As set forth in FIGS. 3B and 3C, the state diagram corresponding to the transmit (TX) pointer interpretation module 41 (FIG. 11A) of the SONET pointer interpretation system 40 (FIG. 4) overcomes the incomplete Bellcore TR-TSY-000253 requirements and the CCITT/ETSI recommendation as noted above by treating a first type of Alarm Indication Signal (AIS) as a subset of a first type of Loss of Pointer state (LOP) and exiting AIS (transition from AIS to NO AIS state 21) when all ones does not exist for three consecutive frames, and defining the transition from the NO LOP state 23 to the LOP state 22 as any sequence of pointers that does not meet the requirement to establish a valid pointer value within eight frames. Precise logic definitions are shown in FIGS. 3B and 3C including the NDF bit pattern.

It should be noted that although the state diagrams shown in FIGS. 3B and 3C are implemented in hardware (FIG. 11A), they could also be implemented in software, if desired.

As seen in FIGS. 3A and 3E, there is a transition from the second type of AIS state 20' to the second type of LOP state 22' when all ones is not present (no AIS or $\overline{\text{NPALL1}}$) for three consecutive frames, and a valid pointer value cannot be established, transition event 26. FIG. 3E illustrates this transition event precisely as $$(3 \times \overline{\text{NPALL1}}) \cdot (\overline{\text{2MATCH} \cdot 3 \times \text{NDF0110}}) \cdot (\overline{\text{VALID} \cdot \text{NDF1001}})$$

If during these three frames the criteria for establishing a valid pointer does not exist (three consecutive matching inrange pointers with NDF=0110 or one in-range pointer with NDF=1001), then the LOP persists. With this information provided to software, the software can easily be modified to latch or not latch the AIS alarm from a system perspective. If the requirements change with respect to latching AIS, expensive hardware changes are thereby avoided.

The event definition used in FIGS. 3B, 3C and 3E is shown in FIG. 11B. In FIG. 11B NDF3OF4 means that a 3 of 4 bit match to pattern 1001 has been made by the pointer interpretation circuit 41. The NDF1001 term simply means NDF active, which by definition is 1001. NDF inactive is thus 0110 (or any value other than 1001).

The truth table shown in FIG. 3D explains how the states shown in FIGS. 3B and 3C are transformed into the pointer interpretation state diagram shown in FIG. 3E. FIG. 3E corresponds to FIG. 3A and makes clear that no Normal Pointer is the inverse (logic NOT) of transition events A AND B. The temporary AIS state shown in FIG. 3D corresponds to the first three scenarios shown in FIG. 12. Thus if AIS is true, LOP will become true if it is not already true.

Although the CCITT state diagram (FIG. 1) and the state diagram representing the Bellcore requirements (FIG. 2) make clear that three consecutive matching pointers is the event for exiting the LOP state, they are inconsistent with regard to entering an LOP state. As set forth in FIG. 2, the Bellcore Interpretation Requirement states that if a "valid pointer" is not seen for eight consecutive frames, an LOP 22 is declared. By defining a "valid pointer" as three consecutive matching in-range pointers with NDF=0110, the present invention prevents random pointers from resulting in an unreliable LOP detection.

Normally three consecutive matching pointers are guaranteed at least every four frames even in the presence of pointer adjustments. This definition guarantees at least two matching pointer opportunities every eight frames under the maximum rate of pointer movement. Therefore, the present invention is error tolerant to one in eight errorred pointers due to bit errors as seen in the last LOP scenario of FIG. 12.

HARDWARE IMPLEMENTATION

Figure 4:
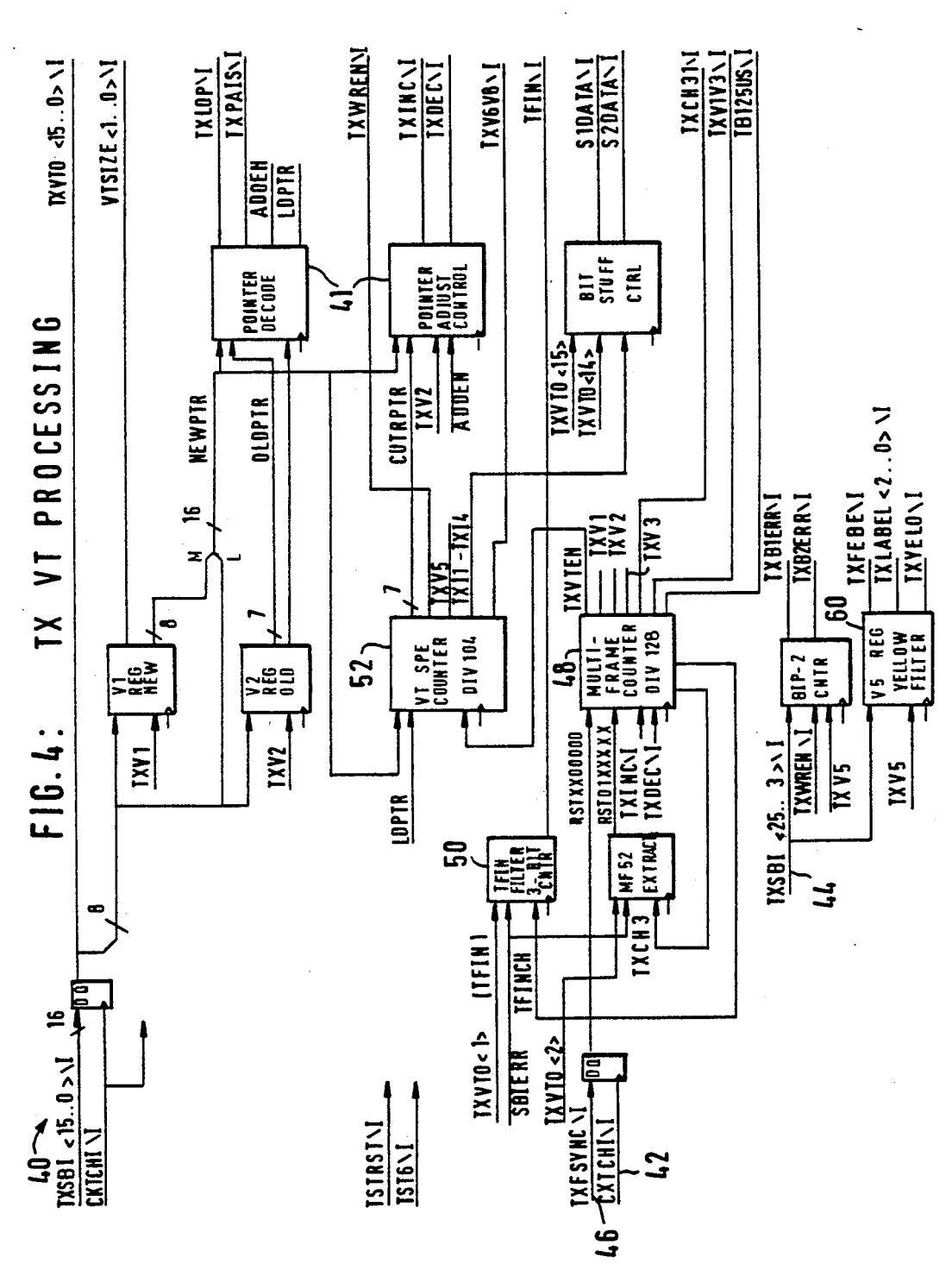

FIG. 4 illustrates an overall block diagram of the transmitter VT processing module which implements VT1.5. SONET pointer interpretation. The input/output description of this overall block diagram is presented in Table 3, while the functions performed by this system are presented in Table 4.

TABLE 3

| Input/Output Description | |
| --- | --- |
| Block Inputs: | Block outputs: |
| TXSBI<15...0> | TXVTO<15...0> |
| CKTCHI (256 KHz) | TXWREN |
| TXFSYNC (8 KHz) | TXCH31 |
| SBIERR | S1DATA |
| SPILL | S2DATA |
| SWTCHOVR | TFIN |
| TSTRST | TXV1V3 |
| TST6 | TXINC |
|  | TXDEC |
|  | VTSIZE<1...0> |
|  | TXLOP |
|  | TXPAIS |
|  | TXV6V8 |
|  | TXB1ERR |
|  | TXB2ERR |
|  | TXFEBE |
|  | TXLABEL<2...0> |
|  | TXYELO |
|  | TB125US |
|  | RSTES |

TABLE 4

Parallel data retiming
SBI multiframe counter
VT SPE frame counter
MFS2 filtering
TFIN filtering
VT1.5 pointer interpretation (PATH AIS, LOP)
V5 processing (BIP-2, LABEL, YELLOW)
Asynchronous bit stuff interpretation (C1 & C2)

More particularly, all the functions performed by the system set forth in FIG. 4 are clocked by the rising edge of a 256 KHz serial bus interface (SBI) channel clock (CKTCHI) 42. Details concerning the serial bus interface protocol are presented in applicant's copending U.S. application, Ser. No. 351,458 filed May 12, 1989, which is hereby incorporated by reference. Although the SBI protocol is used in this disclosed embodiment of the present invention, SBI mapping of the SONET VT1.5 payload need not be used to accomplish the objects set forth above.

The parallel data input (TXSBI<15..0>) is retimed and output as TXVTO<15..0>. The most significant eight bits of the retimed 16 bit input contains the VT SPE data and VI data. Details concerning the VI data are presented in applicant's U.S. Pat. No. 5,027,349, entitled Imbedded Control Technique for Distributed Control Systems, which is hereby incorporated by reference.

The least significant 8 bits contain the V-bit, I-bit, OFFSET address, and parity status of the channel during Channel-31, and the TFIN and MFS 2 bits during payload carrying channels. Only TXVTO<15..8> is sent to the TX partition multiplexer module.

The TXVSYNC input 46 which comes from an active TX SBI input module is retimed and then used to synchronize the SBI multi-frame counter 48 to the frame boundary. The SBI multi-frame counter is a modulo 128 count counter.

The MFS2 bit in the SBI parallel data (TXSBI<15..0>) is extracted from channel-3 and filtered for a 011 pattern. When the pattern is detected with inactive SBIERR, the SBI multi-frame counter is synchronized on the multiframe boundary. See FIG. for timing details.

Once the multiframe boundary has been determined, the VT synchronization signals (TXV1, TXV2, TXV3, TXVTEN) can be decoded from the multiframe counter 48. TXVTEN is active only during SBI channels 2 through 27 which indicate the 104 byte synchronous payload envelope (SPE). V1, V2, and V3 are active during channel-1 and indicate the location of the pointer within parallel data. See FIG. 6 for timing details.

The TFIN (transmit frame indicator) is extracted from the TFIN bit of the parallel SBI data and then filtered at filter module and 8-bit counter 50. A filtered TFIN output goes to the two RX SBI output blocks for transmit multiframe synchronization. The filtering of TFIN prevents unwanted changes in the outgoing RX SBI multiframe synchronization due to parity errors and loss of frame events in the incoming TX SBI. To extract TFIN, a 1100 pattern is detected in TXVT01 during channel 1 through 27. An 8-bit counter 50 (MODOULO 256) regenerates TFIN for the RX SBI Output Blocks. If the 1100 pattern is not present at count 1 of the 8-bit counter two times consecutively, then the next occurrence of the 1100 pattern resets the 8-bit counter to 2. A realignment of TFIN requires up to 24 frames (3 ms).

A VT SPE counter 52 (loadable modulo 104 down counter) is synchronized with the pointer and decrements when TXVTEN is active. To synchronize the counter, the value of the pointer is loaded in the SPE counter during TXV2. When the counter counts down to 0, the start of the SPE is indicated (V5). V5 is one of 4 VT overhead bytes in the SPE. The other 3 overhead bytes (V6, V7, and V8) are reserved and ignored. The next count (103) indicates a byte containing the 193rd DS1 bit, stuff opportunity bits, or stuff control bits. The remaining 96 counts contain 8-bit DS1 data. See FIG. 7 for timing and implementation details.

Pointer interpretation and tracking is performed by the decoding and comparison of three pointer values; the new pointer 54 (NEWPTR), the old pointer 56 (OLDPTR), and the current pointer 58 (CURPTR) (See FIG. 11A). VT path AIS (TXPAIS) is derived from algorithms using only NEWPTR. Loss of pointer (TXLOP), LDPTR, and ADJEN are derived from algorithms using NEWPTR and OLDPTR. TXINC and TXDEC are derived from algorithms using NEWPTR and CURPTR. See FIGS. 3A–3E, 8, 9, 10, 11A, 11B, and 12 for timing and implementation details. Truth table 3D describes the operation of the above-mentioned algorithms. The new V1 register is updated during TXV1 with the new V1 data and combined with TXVTO<15..8> during TXV2 to form NEWPTR. During TXV2, the old V2 register is updated with the new V2 data which is used as the OLDPTR during the next VT super frame.

VTSIZE<1..0> is output from the new V1 register and sent to the RX VI Channel block for status reporting. TXLOP and TXPAIS are output from the pointer decoding block and sent to the RX VI Channel block for performance reporting. TXINC and TXDEC are output from the pointer adjustment control block and sent to the RX VI Channel block where they are accumulated for performance reporting.

Stuff bit interpretation is performed on C1 and C2 (TXVTO<15> and TXVTO<14> respectively) which are identified during TXI2, TXI3, and TXI4. The result of the interpretation is output on S1DATA and S2DATA during TXI4.

The data in the V5 byte is processed by calculating the BIP-2 errors and latching the FEBE and signal label into the V5 register, and filtering of YELLOW (See yellow filter 60 in FIG. 4). The BIP-2 errors are output on TXB1ERR and TXB2ERR and sent to the RX BI Channel block where they are accumulated for performance reporting. TXFEBE, TXLABEL<2..0>, are also output to the RX VI Channel block for performance and status reporting. YELLOW must be active for ten consecutive VT super frames to set TXYELO or inactive for ten consecutive VT super frames to clear TXYELO. TXYELO is output to the RX VI Channel block for status reporting.

The RX Channel block is clocked by CKRCHI which has no guaranteed phase relationship with CKTCHI. All outputs sent to the RX VI Channel block must be transferred properly to guarantee accurate accumulation and to avoid metastability problems. TXV1V3 is generated in the SBI Multiframe counter and output to the RX VI Channel block where an edge detection circuit is used to determine where TXINC and TXDEC are stable. TXV6V8 is generated in the VT SPE counter and output to the RX VI Channel block where an edge detection circuit is used to determine where TXB1ERR, TXB2RR, AND TXFEBE are stable. TXV1V3 and TXV6V8 must be glitch free outputs (registered).

BIP-2 Calculation Requirements

Bits 1 and 2 are used for error performance monitoring. A bit interleaved parity scheme is specified. Bit 1 is set such that parity of all odd-numbered bits (1, 3, 5, and 7) in all bytes of the previous VT SPE is even. Bit 2 is set similarly for the even-numbered bits. The calculation of the BIP-2 includes the VT POH bytes but excludes the VT Pointers. Even parity is generated by setting the BIP-2 bits so that there are an even number of ones in each of the 2-bit sequences including the BIP-2.

Bit Stuff Interpretation Requirements

Two sets (C1 and C2) of stuff control bits are used to control the two stuff opportunities, S1 and S2 respectively. C1 C1 C1=0 0 0 indicates that S1 is a data bit while C1 C1 C1=1 1 1 indicates that S1 is a stuff bit. C2 controls S2 in the same way. Majority vote shall be used to make the stuff decision in the desynchronizer so as to protect against single bit errors in the C-bits.

Pointer Interpretation Requirements

The following list summarizes the rules for interpreting the VT1.5 Pointer as specified in TR-TSY-000253:
1. During normal operation, the pointer locates the start of the VT1.5 SPE within the VT1.5 envelope capacity.
2. Any variation from the current pointer value is ignored unless a consistent new value is received three times consecutively or it is preceded by either rule 4, 5 or 6. Any consistent new value received three times in succession overrides (i.e., takes priority over) rules 4, 5 or 6.
3. The present invention does not interpret the concatenation indicator so this rule does not apply.
4. If the majority of the I-bits of the pointer word are inverted, a positive stuff operation is indicated. Subsequent pointer values are then incremented by one.
5. If the majority of the D-bits of the pointer word are inverted, a negative stuff operation is indicated. Subsequent pointer values are then decremented by one.
6. NDF is set to '1001' then the coincident pointer value replaces the current one at the offset indicated by the new pointer value regardless of the state of the receiver.
7. The present invention does not interpret NDF on a VT group basis, so this rule does not apply.

New Data Flag (NDF)—The decoding is performed by accepting NDF set to '1001' if at least 3 bits match (See FIG. 11A and 11B).

SONET equipment enters an LOP state when a VT pointer cannot be obtained by using the pointer interpretation rules described above. The network element (NE) also enters an LOP state when a number of consecutive pointers are received with the NDF set to '1001', not including concatenation. Under normal operation, the NDF is set only once to indicate a change in the pointer value. Except when set continuously in a concatenation indication, consecutive NDF's indicate a pointer processor failure (e.g., stuck bits).

SONET equipment enters an LOP state on a floating VT if a valid pointer is not found in eight consecutive VT superframes or if eight consecutive NDF's are detected. Incoming VT Path AIS does not result in SONET equipment entering an LOP state on that floating VT.

SONET equipment exit an LOP state when a valid pointer with normal NDF is detected in three consecutive VT superframes.

VT Path AIS is detected by a VT PTE as an all ones pattern in bytes V1 and V2 in three consecutive VT superframes, at which point the VT PTE enters an VT-Path AIS state.

Removal of VT-Path AIS is detected by the VT PTE as a valid VT pointer and is observed with a valid VT size and NDF set to '1001', or when a valid VT pointer with a valid VT size and a normal NDF is observed in three consecutive VT superframes. The detection of the removal of VT-Path AIS causes the VT PTE to exit the VT-Path AIS state.

As noted above with regard to the pointer interpretation requirements, the Bellcore's requirements in TR-TSY-000253 are inconsistent, incomplete and conflicting. The present invention as set forth in the state diagram shown in FIG. 3A and 3E is believed to meet the requirements of this document while providing flexibility through which system software modifications can be made. In particular, the TX VT processing system shown in FIG. 4 achieves the state diagram implementation shown in FIGS. 3B and 3C which provides a more stable hardware implementation and meets the intent of both the CCITT and Bellcore requirements. In so doing, it specifically exits AIS when all ones does not exist for three frames and defines an LOP as any sequence of pointers that do not meet the requirements to establish a valid pointer value within eight frames.

It should be noted that the present invention can be applied to various pointer protocols, including synchronous transport module level 1 (STM-1), synchronous transport signal level 1 (STS-1), virtual tributary (VT) CCITT tributary unit (TU) and administrative unit (AU) pointer interpretation functions. By providing one technique for all pointer processor designs, more consistent characteristics and less confusion in terms of system behavior results.

Applications for the present invention therefore include STS-1 pointer interpretation, STS-3c pointer interpretation, VT pointer interpretation (VT1.5 VT2, VT3, and VT6), STM-1 pointer interpretation (CCITT AU4 PAYLOAD), and TU (tributary unit) pointer interpretation (CCITT payloads which include TU32, TU21, TU11, TU12, TU22 and TU32).

It will thus be seen that the objects set forth above and those made apparent from the preceding description, are efficiently attained, and since certain changes may be made in carrying out the above construction and methodology without departing from the scope of the invention, it is intended that all matters contained in the above description or shown in the accompanying drawings, shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Having described the invention, what is claimed is:

1. A system for performing pointer interpretation, in which the pointer can be interpreted in one of three states; namely, normal (NORM), Loss of Pointer (LOP) of a second type, or Alarm Indication Signal (AIS) of a second type, wherein the pointer contains a pointer value which is considered valid when within a predetermined range and invalid otherwise, and a New Data FLAG (NDF) having a plurality of bits such that NDF is considered active if its bit pattern is in a first configuration and is considered normal if its bit pattern is in a second configuration, said system comprising:

A) means for receiving a pointer value and for decoding the presence of a valid pointer;
B) means for storing at least a portion of the two most recently received pointer values;
C) means for maintaining an accepted pointer value, wherein the acceptance criteria is defined as three consecutive matching incoming valid pointers or NDF active;
D) means for entering a first type of AIS state if three consecutive pointers are received with each pointer in a predetermined state;
E) means connected to the storing means, for comparing three consecutive pointer values so as to generate a 2MATCH true signal if said three pointer values are matching and not invalid;
F) means for entering a NO AIS state (AIS of the first type) if:
   1) a valid pointer is received and NDF is active, or
   2) the three most recently received pointers are each not in said predetermined state;
G) means interfaced with the comparison means, for entering a first type of LOP state if eight consecutive occurrences of either NDF not normal or 2MATCH true has not occurred;
H) means (CLR input to flipflop with LOP output in FIG. 11A) for entering a NO LOP (LOP of the first type) state if;
   1) a valid pointer and NDF active and AIS of the first type is detected, or
   2) 2MATCH true and three NDF's normal have been detected; and
I) means, interfaced with the AIS state of the first type, NO AIS state of the first type, LOP state of the first type, and NO LOP state of the first type, for converting said states into an AIS state of the second type, an LOP state of the second type, and the NORM state.

2. A system for performing pointer interpretation as defined in claim 1, wherein the converting means converts the AIS and LOP states, each of the first type, to the NORM state, the LOP state of the second type, or the AIS state of the second type as defined by the following truth table:

| AIS STATE TYPE 1 | LOP STATE TYPE 1 | OUTPUT STATE |
|---|---|---|
| 0 | 0 | NORM |
| 0 | 1 | LOP TYPE 2 |
| 1 | 0 | AIS TYPE 2 |
| 1 | 1 | AIS TYPE 2 |

3. A system for performing pointer interpretation as defined in claim 2, wherein the AIS TYPE 2 state generated from the AIS STATE TYPE 1 true (1) and LOP STATE TYPE 1 false (0) is a temporary state.

4. A system for performing pointer interpretation as defined in claim 2, wherein the predetermined pointer state is an all ones state (NPALL1) and the NDF bit patterns for the first and second configurations are respectively 0110 (NDF0110) and 1001 (NDF1001), and wherein the transition from the AIS state of the second type to the LOP state of the second type is defined by the equation:

$$(3 \times \overline{NPALL1}) \cdot (\overline{2MATCH \cdot 3 \times NDF0110}) \cdot \overline{(VALID \cdot NDF1001)}$$

5. A system for performing pointer interpretation, in which the pointer can be interpreted in one of three states; namely, normal (NORM), Loss of Pointer (LOP) of a second type, or Alarm Indication Signal (AIS) of a second type, wherein the pointer contains a New Data FLAG (NDF) having a plurality of bits such that NDF is considered active if its bit pattern is in a first configuration and is considered normal if its bit pattern is in a second configuration, said system comprising the steps of:

A) receiving a pointer value and decoding the presence of a valid pointer;
B) storing at least a portion of the two most recently received pointer values;
C) maintaining an accepted pointer value, wherein the acceptance criteria is defined as three consecutive matching incoming valid pointers or NDF active;
D) entering a first type of AIS state if three consecutive pointers are received with each pointer in a predetermined state;
E) comparing three consecutive pointer values so as to generate a 2MATCH true signal if said three pointer values are matching and not invalid;

F) entering a NO AIS state (AIS of the first type) if:
  1) a valid pointer is received and NDF is active, or
  2) the three most recently received pointers are each not in said predetermined state;
G) entering a first type of LOP state if eight consecutive occurrences of either NDF not normal or 2MATCH true has not occurred;
H) entering a NO LOP (LOP of the first type) state if;
  1) a valid pointer and NDF active and AIS of the first type is detected, or
  2) 2MATCH true and three NDF's normal have been detected; and
I) converting the AIS state of the first type, NO AIS state of the first type, the LOP state of the first type, and NO LOP state of the first type into an AIS state of the second type, an LOP state of the second type, and the NORM state.

6. A system for performing pointer interpretation as defined in claim 5, wherein the converting step converts the AIS and LOP states, each of the first type, to the NORM state, the LOP state of the second type, or the AIS state of the second type as defined by the following truth table:

| AIS STATE TYPE 1 | LOP STATE TYPE 1 | OUTPUT STATE |
|---|---|---|
| 0 | 0 | NORM |
| 0 | 1 | LOP TYPE 2 |
| 1 | 0 | AIS TYPE 2 |
| 1 | 1 | AIS TYPE 2 |

7. A system for performing pointer interpretation as defined in claim 6, wherein the AIS TYPE 2 state generated from the AIS STATE TYPE 1 true (1) and LOP STATE TYPE 1 false (0) is a temporary state.

8. A system for performing pointer interpretation as defined in claim 6, wherein the predetermined pointer state is an all ones state (NPALL1) and the NDF bit patterns for the first and second configurations are respectively 0110 (NDF0110) and 1001 (NDF1001), and wherein the transition from the AIS state of the second type to the LOP state of the second type is defined by the equation:

$$(3 \times \overline{NPALL1}) \cdot (\overline{2MATCH \cdot 3 \times NDF0110}) \cdot (\overline{VALID \cdot NDF1001})$$

* * * * *

UNITED STATES PATENT AND TRADEMARK OFFICE
CERTIFICATE OF CORRECTION

PATENT NO. : 5,210,762
DATED : May 11, 1993
INVENTOR(S) : Weeber et al It is certified that error appears in the above-identified patent and that said Letters Patent is hereby corrected as shown below:

At column 14, line 45, please change "system" to --method--; and at line 53, please change "system" to --method--.

At column 15, line 20, please change "system" to --method--.

At column 16, line 10, please change "system" to --method--;

at line 14, please change "system" to --method--; and at line 19, please change "the LOP" to --a LOP--.

Signed and Sealed this

Twenty-third Day of August, 1994

Attest:

BRUCE LEHMAN

*Attesting Officer*     *Commissioner of Patents and Trademarks*